(12) United States Patent
Awakura et al.

(10) Patent No.: US 7,082,650 B2
(45) Date of Patent: Aug. 1, 2006

(54) SNAP FIT MECHANISM

(75) Inventors: Yoshifumi Awakura, Tokyo (JP);
Kazutoshi Taniguchi, Tokyo (JP);
Hideaki Kikuchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/833,120

(22) Filed: Apr. 28, 2004

(65) Prior Publication Data

US 2004/0244158 A1 Dec. 9, 2004

(30) Foreign Application Priority Data

Jun. 6, 2003 (JP) ............................. 2003-162657

(51) Int. Cl.
*F16B 19/00* (2006.01)
*A44B 21/00* (2006.01)

(52) U.S. Cl. ....................................... 24/458; 411/913

(58) Field of Classification Search .................. 24/614, 24/458, 615; 403/408.1, 15, 155; 16/386, 16/DIG. 40; 411/913
See application file for complete search history.

(56) References Cited

U.S. PATENT DOCUMENTS

| | | | | |
|---|---|---|---|---|
| 3,449,799 A * | 6/1969 | Bien | ........................... | 411/913 |
| 3,476,165 A * | 11/1969 | Vaughn | ...................... | 411/103 |
| 3,815,182 A * | 6/1974 | Guard et al. | ................... | 24/453 |
| 4,150,646 A * | 4/1979 | Aoyama et al. | ............ | 123/676 |
| 4,356,987 A * | 11/1982 | Schmid | ........................ | 24/458 |
| 4,405,272 A * | 9/1983 | Wollar | ........................ | 411/45 |
| 5,547,322 A * | 8/1996 | Lilja et al. | ................... | 411/509 |
| 5,678,953 A * | 10/1997 | Usui et al. | ................... | 403/329 |
| 5,862,024 A * | 1/1999 | Watanabe | .................... | 403/277 |
| 6,412,163 B1 * | 7/2002 | Russell | ....................... | 403/289 |

FOREIGN PATENT DOCUMENTS

JP 8-111157 A 4/1996

* cited by examiner

*Primary Examiner*—Robert J. Sandy
(74) *Attorney, Agent, or Firm*—Sughrue Mion, PLLC

(57) ABSTRACT

A snap fit mechanism has an elastic tongue provided on a base of the mechanism. On the tip of the tongue is provided an engaging claw that has an engaging inclined face. A far end of the engaging inclined face from the base is arranged so as to be located between the outside face of the elastic tongue and the centerline C in a longitudinal direction of the elastic tongue. Further, on the tip of the elastic tongue is provided an engagement-maintaining inclined face which gives an outward load to the elastic tongue on receiving an accidental load thereon so as to reduce the inward elastic deformation of the elastic tongue, thereby preventing the accidental release of the engagement of the tongue.

11 Claims, 3 Drawing Sheets

SNAP FIT MECHANISM

BACKGROUND OF THE INVENTION

1. Field of the Invention

The present invention relates to a snap fit mechanism used for securing a component provided, for example, in a disk playback device.

2. Description of Related Art

For example, JP-A 08-111157 (claim 1 and FIG. 5) discloses a conventional snap fit mechanism of the type to which the present invention relates, provided in an electrical appliance and its attachment. The conventional snap fit mechanism known to the inventor is composed of a first engaging portion provided on the electrical appliance side and a second engaging portion provided on the case (serving as its attachment) side. The first engaging portion includes a concave portion formed on the sidewall of the electrical appliance and a pair of protrusions that are formed within the concave portion and reduces the opening space of the portion. The second engaging portion includes an elastic tongue that is projected from one plane face of the case and that has a pair of engaging claws formed at the tip of the tongue, elastically engaging the pair of protrusions provided in the first engaging portion, respectively. Each of the engaging claws is composed of a sideward face, which extends sideward from the tip of the elastic tongue and secures the electrical appliance between the one plane face of the case and the sideward face itself, and an inclined face, which extends across the end of this sideward face, which is remote from the elastic tongue, and the tip of the elastic tongue. Moreover, at the tip of the elastic tongue is provided a top face having a plane face that is orthogonal to a longitudinal direction of the elastic tongue and that is connected with the extreme end of the inclined face of the engaging claw.

The operation will now be described as below.

First of all, on securing the to-be-secured member (attachment) in the electrical appliance, when the case (serving as the attachment) is made to approach the electrical appliance to thereby make the extreme end of the inclined face of the engaging claw contact the protrusion of the electrical appliance, and then the protrusion of the electrical appliance is made to slide from the extreme end of the inclined face thereof to the case side along the inclined face of the engaging claw, the elastic tongue is elastically deformed to the side opposite the engaging claw (that is, inwardly from the elastic tongue) in accordance with this sliding movement. When the case is further pressed against the protrusion of the electrical appliance, the tip of the engaging claw, that is, the end of the sideward face thereof goes across the protrusion of the electrical appliance. At that time, the elastic tongue recovers to its original posture by the restoring force exerted by its elasticity, thereby securing the electrical appliance between the one plane face of the case and the sideward face of the engaging claw.

However, because the conventional snap fit mechanism is configured as mentioned above, there has been the following problem when the mechanism is applied for securing a tabular component, for example, in a disk playback device. The elastic tongue of the conventional snap fit mechanism is inserted into the through hole of the tabular component, and then the engaging claw of the elastic tongue is engaged with the edge of the through hole thereof, thereby enabling securing of the tabular component in the device. However, after securing the tabular component therein, when, for example, a worker's finger or the like at assembling work contacted the tip of the elastic tongue, which is exposed from the through hole, the elastic tongue may be inwardly elastically deformed by the load received on the inclined face of the engaging claw. This is because at the tip of the elastic tongue is formed a top face, and the inclined face of the engaging claw is formed adjacent to this top face. As a result, there is a problem that at that time the engaging claw snaps out of the edge of the through hole of the tabular component, and thereby the engagement of the existing snap fit mechanism with the tabular component is accidentally released.

SUMMARY OF THE INVENTION

The present invention has been accomplished to solve the above-mentioned problem. An object of the present invention is to provide a snap fit mechanism whose engagement upon securing a component is as easy as the conventional one and that prevents an accidental disengagement thereof after securing of the component.

A snap fit mechanism according to one aspect of the present invention includes: a base having a first securing face; an elastic tongue extending from the first securing face of the base; and an engaging claw, extending sideward from the tip of the elastic tongue, including a second securing face for securing a to-be-secured member between the first securing face of the base and the second securing face itself and a first inclined face extending obliquely sideward from the tip of the elastic tongue, and a far end of the first inclined face from the base is located between one side face on the second securing face side of the elastic tongue and the center line in a longitudinal direction of the elastic tongue.

Therefore, according to the present invention, even if the tip of the elastic tongue receives a load exerted toward the base side after the to-be-secured member is secured, because the far end of the first inclined face from the base is located close to the one side face on the second securing face side of the elastic tongue across the centerline in a longitudinal direction of the elastic tongue, the amount of the elastic deformation of the elastic tongue to the side which is opposite the second securing face of the elastic tongue can be reduced in compared with the case in which the far end of the first inclined face from the base is located at the position that is remote across the above-mentioned centerline from the one side face of the elastic tongue, and thereby the accidental disengagement of the engaging claw with the to-be-secured member can be prevented.

In addition, upon securing the to-be-secured member, when the base is made to approach the edge of the to-be-secured member to thereby make the far end of the first inclined face of the engaging claw contact the edge of the to-be-secured member, and further the edge of the to-be-secured member is made to slide along the first inclined face from the far end thereof to the base side, the elastic tongue is elastically deformed to the side which is opposite to the second securing face thereof as the edge of the member slides therealong.

Further, when the base is pressed against the edge of the to-be-secured member, the tip of the engaging claw, that is, the end of the second securing face slides along the edge of the to-be-secured member from the base side (of the mechanism) of the member to the tip side (of the elastic tongue) of the member, and at the terminal on the engaging claw side of the edge of the to-be-secured member, the elastic tongue recovers to its original posture by the restoring force exerted by its elasticity, thereby enabling positively securing the to-be-secured member between the first securing face of the base and the second securing face of the engaging claw.

In addition, this engagement can be brought about with a force similar to the one used for carrying out the engagement with the conventional snap fit mechanism.

DETAILED DESCRIPTION OF THE PREFERRED EMBODIMENTS

An embodiment of the present invention will be described below.

First Embodiment

Figure 1:
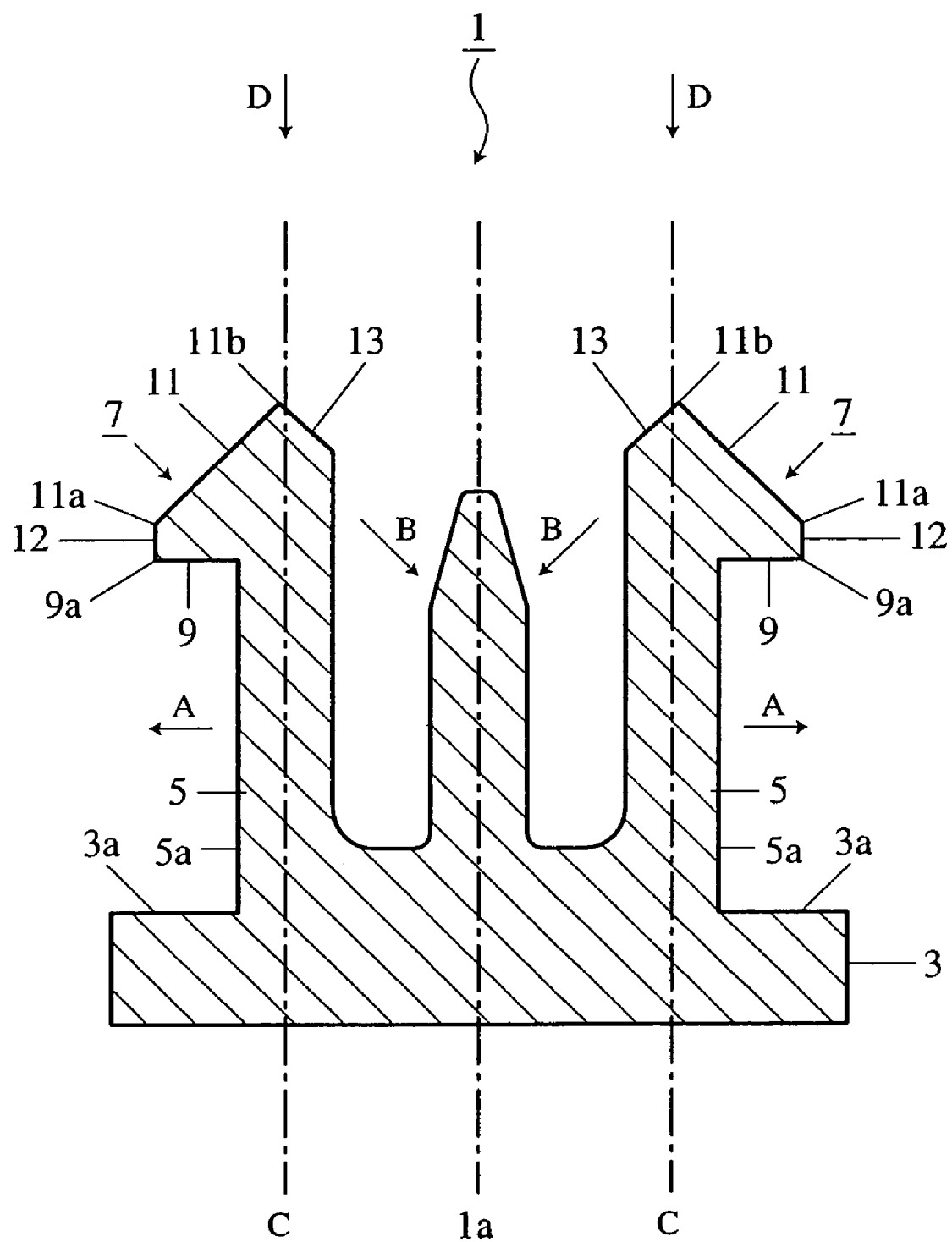
FIG. 1 is a sectional view of a snap fit mechanism according to a first embodiment of the present invention.
Figure 2:
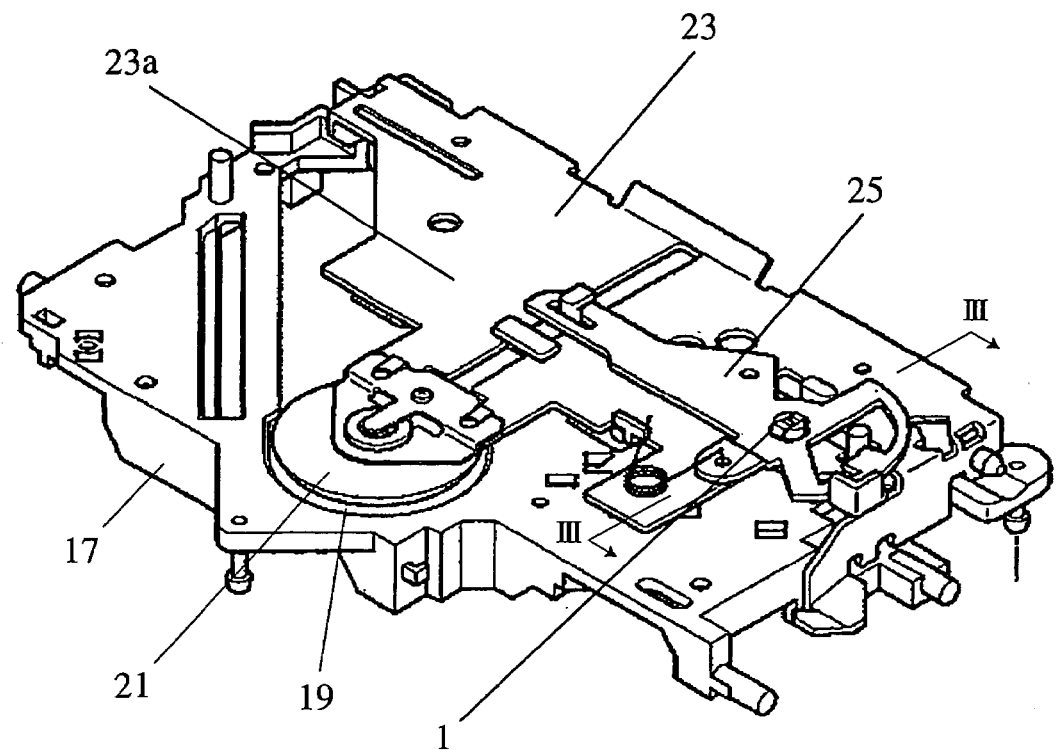
FIG. 2 is a general perspective view of an example of applying the snap fit mechanism shown in FIG. 1 to the securing of a component used in a disk playback device.
Figure 3:
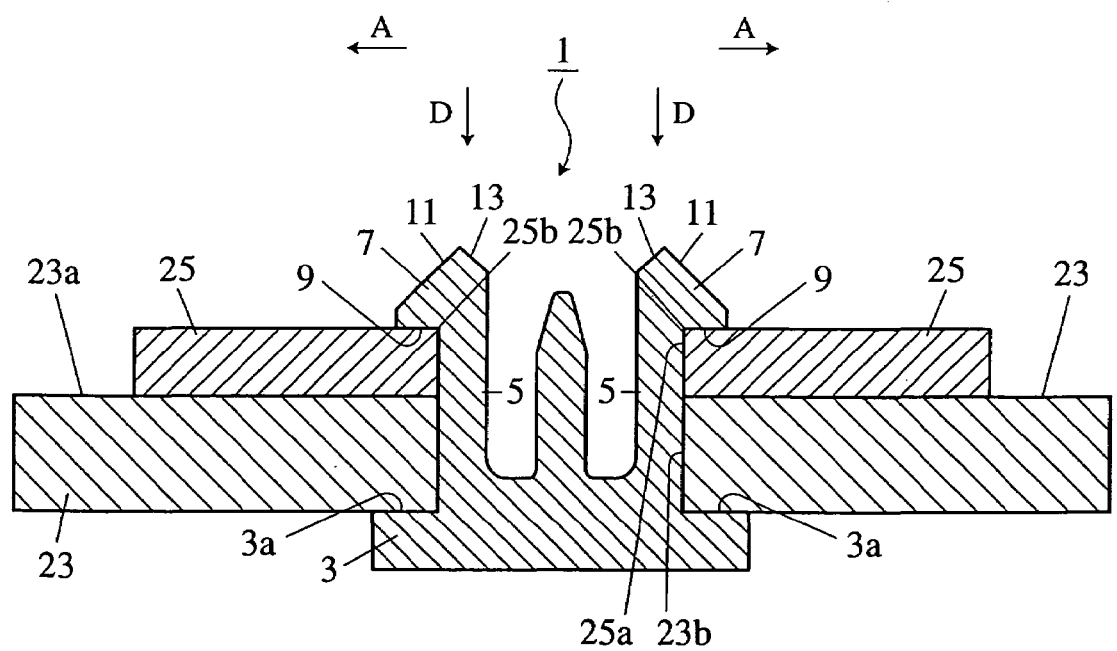
FIG. 3 is a sectional view taken on the line III—III of FIG. 2.

FIG. 1 is a sectional view of a snap fit mechanism according to a first embodiment of the present invention. FIG. 2 is a general perspective view of one example of applying the snap fit mechanism shown in FIG. 1 to the securing of a component applied in a disk playback device. FIG. 3 is sectional view taken on the line III—III of FIG. 2. The first embodiment is an example of applying the snap fit mechanism according to the present invention to the purpose of securing two tabular components (to-be-secured members) in a stacking state through through-holes formed at a common internal diameter in the components, respectively.

As shown in FIG. 1, a snap fit mechanism 1 can be generally composed of a base 3 that is of tabular shape and has a plane top face (first securing face) 3a, two or more elastic tongues 5 (only two elastic tongues are shown in FIG. 1 and FIG. 3 though the mechanism according to the first embodiment has four tongues) that each upwardly extend from the top face 3a of this base 3, and engaging claws or clicks 7 that each outwardly extend (in a direction of arrow A) from the upper end (tip) of this elastic tongue 5.

Each of the engaging claws 7 can be generally composed of a sideward face (second securing face) 9 that secures a tabular component (to-be-secured member), which is described later, between the top face 3a of the base 3 and the sideward face itself, an engaging inclined face (first inclined face) 11 that extends from the end 9a of this sideward face 9, which is remote from the elastic tongue 5, to the upper end of the elastic tongue 5, and an outside face 12 that extends from a near end 11a of this engaging inclined face 11 from the base 3 to the end 9a of the sideward face 9 in a direction longitudinally of the elastic tongue 5. The engaging inclined face 11 of the engaging claw 7 can have a function that contacts the edge of the through hole of the tabular component, described later, when the elastic tongue 5 is inserted in the through hole thereof, thereby receives a predetermined load to force the elastic tongue 5 to be inwardly (in a direction of arrow B) elastically deformed, and makes easy the engagement of the engaging claw 7 into the through hole of the tabular component, described later.

A far end 11b of the engaging inclined face 11 from the base 3 in the first embodiment can be arranged so as to be located between the outside face (one side face) 5a on the sideward face 9 side of the elastic tongue 5 and the centerline C in a longitudinal direction of the elastic tongue 5. Here, the centerline C in a longitudinal direction of the elastic tongue 5 means the line passing the central portion of the elastic tongue 5, not containing the engaging claw 7, such that the displacement of the elastic tongue 5 in a direction perpendicular to the longitudinal direction of the elastic tongue 5 is smallest when the elastic tongue 5 is elastically deformed. As mentioned above, the setting position of the far or distant end 11b of the engaging inclined face 11 can be limited to the above-mentioned range. This is because when the far end 11b of the engaging inclined face 11 is located outside across the outside face 5a of the elastic tongue 5, the insertion of the elastic tongue 5 into the through holes of the tabular components, described later, becomes difficult; and when the far end 11b of the engaging inclined face 11 is located inside across the centerline C in a longitudinal direction of the elastic tongue 5, in a case where, for example, a worker's finger or the like is in contact with the tip of the elastic tongue 5 at assembling work, the amount of the inward (in a direction of arrow B) elastic deformation of the elastic tongue 5 caused by the load received on the engaging inclined face 11 of the engaging claw 7 becomes larger, thus rendering the engaging claw 7 easily disengaging out of the through holes of the tabular components described later.

The angle of inclination of the engaging inclined face 11 of the engaging claw 7 relatively to the longitudinal direction of the elastic tongue 5 can be properly determined after comprehensive consideration of various factors such as the direction of the inward elastic deformation of the elastic tongue 5 caused by the load received on the engaging inclined face 11 of the engaging claw 7 upon the insertion and the volume of the elastic tongue 5 thrust into the through holes of the tabular components described later.

Moreover, the tip of the elastic tongue 5 is formed with an engagement-maintaining inclined face (second inclined face) 13 on the inside opposite to the engaging inclined face 11 of the engaging claw 7. Though there is a possibility that the engagement-maintaining inclined face 13 receives an accidental load caused by contacting with a worker's finger or the like at assembling work, similarly to the engaging inclined face 11, this engagement-maintaining inclined face 13 has a function that gives an outward load to the elastic tongue 5 by receiving the above-described load, and that thereby blocks the inward (in a direction of arrow B) elastic deformation of the elastic tongue 5 caused by the load received on the engaging inclined face 11, thereby enabling the maintenance of the engagement of the engaging claw 7 in the through holes of the tabular components described later. That is, because the resultant force of the load received on the engaging inclined face 11 and the load received on the engagement-maintaining inclined face 13 can be exerted toward the base 3 side along the longitudinal direction of the elastic tongue 5, the load received on the engaging inclined face 11 can be substantially kept out of participation in inwardly elastically deforming the elastic tongue 5 by the load received on the engagement-maintaining inclined face 13. Further, the far end of the engagement-maintaining inclined face 13 in the first embodiment can coincide with the far end 11b of the engaging inclined face 11 of the engaging claw 7 in the first embodiment, and this far end 11b can be arranged so as to be located close to the sideward face 9 side across the centerline C in a longitudinal direction of the elastic tongue 5, that is, outside.

The angle of inclination of the engagement-maintaining inclined face 13 with respect to the longitudinal direction of the elastic tongue 5 can be properly determined by consideration of the angle of inclination of the engaging inclined face 11 of the engaging claw 7 or any other factors.

Such a snap fit mechanism 1 can be applied to the fastening of the component used in a disk playback device 15 shown in FIG. 2. The disk playback device 15 includes a turntable 19 provided on a floating member 17 swingably supported within a chassis (not shown), a tabular arm-clamper (to-be-secured member) 23 that swingably supports a clamper 21 holding, from above, a disk (not shown) mounted on this turntable 19, and a tabular lever stopper (to-be-secured member) 25 provided on the top face 23a of this arm-clamper 23. The through hole 23b of the arm-clamper 23 and the through hole 25a of the lever stopper 25 is of the same size in the internal diameter as shown in FIG. 3. The lever stopper 25 is supported by the arm-clamper 23, rotatably around the medial axis 1a of the snap fit mechanism 1 along the top face 23a of the arm-clamper 23 with the snap fit mechanism 1 which is inserted in the through holes 23b and 25a.

The distance between the far end 11b of the engaging inclined face 11 of the engaging claw 7 provided on the elastic tongue 5 and another far end 11b of the engaging claw 7 provided in the case where two or more elastic tongues 5 are provided in the snap fit mechanism 1, can be arranged so as to be smaller than each of the internal diameter sizes of the through hole 23b and the through hole 25a in order to make easy the insertion of the elastic tongue 5 into the through hole 23b of the arm-clamper 23 and the through hole 25a of the lever stopper 25. Therefore, whenever the tip of the elastic tongue 5 is inserted into the through hole 23b of the arm-clamper 23, the lower edge of the through hole 23b will abut a part of the engaging inclined face 11 of the engaging claw 7.

The operation will now be described as below.

First of all, after the lever stopper 25 is mounted on the top face 23a of the arm-clamper 23, the through hole 25a of the lever stopper 25 is aligned with the through hole 23b of the arm-clamper 23. Subsequently, the tip of the elastic tongue 5 of the snap fit mechanism 1 is brought close to the through hole 23b, and the engaging inclined face 11 of the engaging claw 7 is made to abut against the lower edge of the through hole 23b, thereby inserting the elastic tongue 5 into the through hole 23b under such a condition. At that time, the lower edge of the through hole 23b can slide along the engaging inclined face 11 from the far end 11b side to the lower side, and the elastic tongue 5 can be elastically deformed in a direction of arrow B along with this sliding. The elastic tongue 5 to be inserted in this elastically deformed state can be inserted into the through hole 23b and the through hole 25a while the outside face 12 of the engaging claw 7 is abutting the inner wall of the through hole 23b and the inner wall of the through hole 25a in this order. When the outside face 12 of the claw goes across the upper edge (terminal end on the engaging claw side) 25b of the through hole 25a, the elastic tongue 5 can recover to its original posture before elastic deformation due to the restoring force exerted by its elasticity. At this time, the sideward face 9 of the engaging claw 7 can slide within the through hole 25a while making the upper edge face of the through hole 25a turn outward, until the inner wall of the through hole 25a abuts the outside face 5a of the elastic tongue 5, and the engaging claw 7 can be thereby engaged in the through hole 25a of the lever stopper 25. In such a way, the arm-clamper 23 and the lever stopper 25 can be rotatably secured between the top face 3a of the base 3 and the sideward face 9 of the engaging claw 7 in the snap fit mechanism 1.

After the arm-clamper 23 and the lever stopper 25 are rotatably secured by the snap fit mechanism 1, even if the engaging inclined face 11 receives a load exerted toward the base 3 (in a direction of arrow D) due to the contact of, for example, a worker's finger or the like with the tip of the elastic tongue 5 at assembling work, the amount of the elastic deformation of the elastic tongue 5 in an inward direction of the tongue (in a direction of arrow B) can be reduced as compared with the case where the far end 11b of the engaging inclined face 11 is located inwardly across the above-mentioned centerline C. This is because the far end 11b is located close to the outside face 5a of the elastic tongue 5 across the center line C in a longitudinal direction of the elastic tongue 5. In addition, even if a worker's finger or the like comes in contact with the engagement-maintaining inclined face 13 of the elastic tongue 5, the resultant force of the load received on the engagement-maintaining inclined face 13 and the load received on the engaging inclined face 11 can be exerted substantially toward the base 3 side in a direction longitudinally of the elastic tongue 5. Therefore, the load received on the engaging inclined face 11 cannot substantially participate in deforming the elastic tongue 5 inwardly elastically by the load received on the engagement-maintaining inclined face 13. Also in this regard, the amount of the elastic deformation of the elastic tongue 5 in an inward direction of the tongue can be reduced.

As mentioned above, according to the first embodiment, the far end 11b of the engaging inclined face 11 from the base 3 in the engaging claw 7 is arranged so as to be located between the outside face 5a of the elastic tongue 5 and the centerline C in a longitudinal direction of the elastic tongue 5. Therefore, when the arm-clamper 23 and the lever stopper 25 as to-be-secured members are rotatably secured by the snap fit mechanism 1, the insertion of the elastic tongue 5 into the through hole 23b, that is, the engagement of the engaging claw 7 in the upper edge of the through hole 25a can be easily carried out by a force similar to the one of the conventional snap fit mechanism, by locating the far end 11b of engaging inclined face 11 inwardly from the outside face 5a of the elastic tongue 5 that substantially coincides with the positions of the inner walls of the through hole 23b of the arm-clamper 23 and the through hole 25a of the lever stopper 25. Furthermore, because the far end 11b of the engaging inclined face 11 is located close to the outside face 5a of the elastic tongue 5 across the centerline C in a longitudinal direction of the elastic tongue 5, even if the engaging inclined face 11 receives a load exerted toward the base 3 (in a direction of arrow D) by the contact of, for example, a worker's finger or the like with the tip of the elastic tongue 5 at assembling work, the accidental release of the engagement can be prevented by reducing the amount of the inward elastic deformation of the elastic tongue 5 as compared with the case in which the far end 11b is located inwardly across the above-mentioned centerline C.

According to the first embodiment, the snap fit mechanism is arranged such that the engagement-maintaining inclined face 13 is provided at the tip of the elastic tongue 5, and the far end 11b of the engaging inclined face 11 that substantially coincides with the uppermost or far end of this engagement-maintaining inclined face 13 is located close to the outside face 5a across the centerline C in a longitudinal direction of the elastic tongue 5. Therefore, even if, for example, a worker's finger or the like comes in contact with the engagement-maintaining inclined face 13 of the elastic tongue 5, the load received on the engaging inclined face 11 can be substantially kept out of participation in inwardly elastically deforming the elastic tongue 5 by the load received on the engagement-maintaining inclined face 13. As a result, the amount of the inward elastic deformation of the elastic tongue 5 can be reduced, thereby preventing an accidental disengagement of the engaging claw 7.

Second Embodiment

Figure 4:
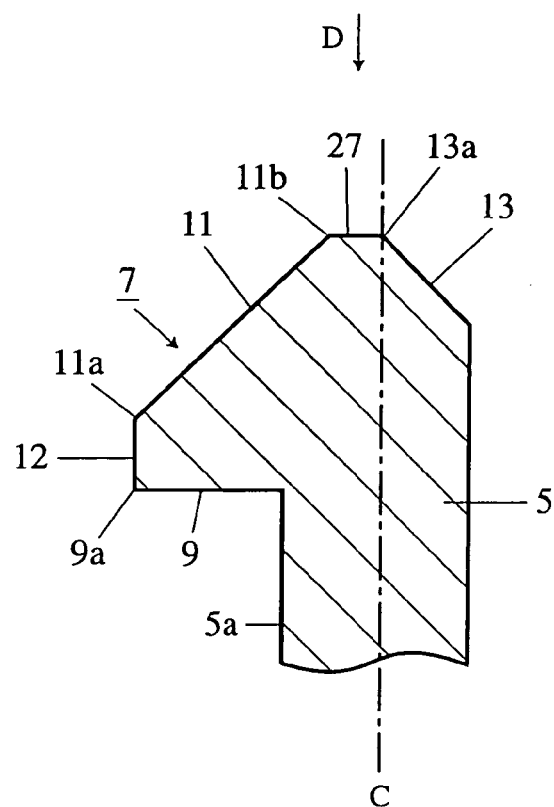
FIG. 4 is an enlarged sectional view of the essential part of a snap fit mechanism according to a second embodiment of the present invention.

FIG. 4 is an enlarged sectional view of the essential part of a snap fit mechanism according to a second embodiment of the present invention. Of the constituent elements used in the second embodiment, the constituent elements that are common to the ones used in the first embodiment are designated by similar numerals. The explanation of the elements will be omitted.

It has been found that particularly good results are obtained if a plane top face 27 having a plane face which is substantially orthogonal to the longitudinal direction of the elastic tongue 5 is provided between the far end 11b of the engaging inclined face 11 from the base 3 in the engaging claw 7, which is provided at the tip of the elastic tongue 5, and the far end 13a of the engagement-maintaining inclined face 13 from the base 3. Furthermore, in the second embodiment, it can be arranged that the far end of the engagement-maintaining inclined face 13 be proved besides the far end 11b of the engaging inclined face 11. Therefore, the far end 13a of the engagement-maintaining inclined face 13 can be arranged so as to be located close to the outside face 5a across the centerline C in a longitudinal direction of the elastic tongue 5.

The operation will now be described as below.

Because the engaging operation and the engagement-maintaining operation of the snap fit mechanism 1 with the arm-clamper 23 and with the lever stopper 25 are similar to the ones in the first embodiment, the explanation thereof will be omitted.

As mentioned above, according to the second embodiment, the snap fit mechanism 1 can be arranged such that the top face 27 is provided at the tip of the elastic tongue 5. Therefore, in addition to the effect obtained in the first embodiment, another component can be mounted above the top face 27 besides the arm-clamper 23 and the lever stopper 25 after securing these components. Furthermore, the component mounted above the top face 27 can cover the engaging inclined face 11 and the engagement-maintaining inclined face 13 of the elastic tongue 5. This can prevent an accidental contact against the engaging inclined face 11 and the engagement-maintaining inclined face 13, thereby positively avoiding the accidental release of the engagement between the mechanism and the to-be-secured components.

Third Embodiment

Figure 5:
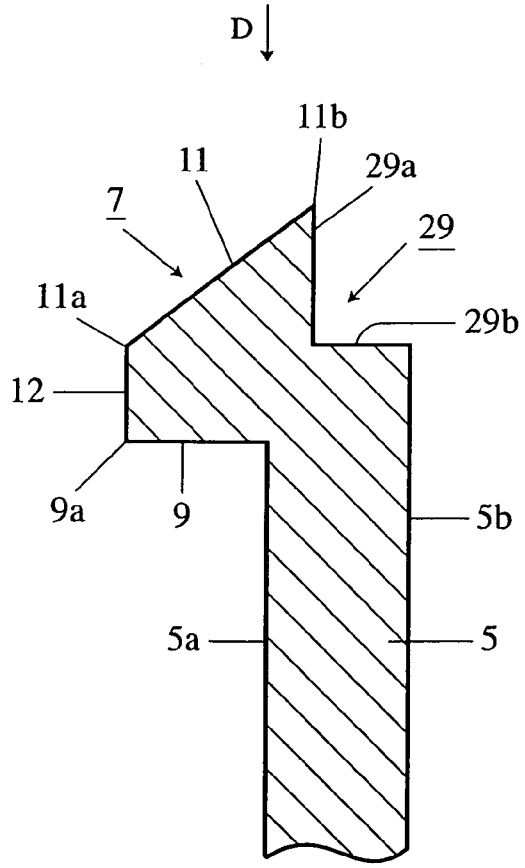
FIG. 5 is an enlarged sectional view of the essential part of a snap fit mechanism according to a third embodiment of the present invention.

FIG. 5 is an enlarged sectional view of the essential part of a snap fit mechanism according to a third embodiment of the present invention. Of the constituent elements used in the third embodiment, the constituent elements that are common to the ones in the first and second embodiments are designated by similar numerals. The explanation of the elements will be omitted.

It has been found that particularly good results are obtained if, in place of the engagement-maintaining inclined face 13 in the first embodiment, a notch 29 is provided on the side which is opposite the engaging inclined face 11 of the engaging claw 7 (that is, inside the elastic tongue 5) at the tip of the elastic tongue 5. This notch 29 can be composed of a first plane face 29a that extends parallel to the longitudinal direction of the elastic tongue 5 from the tip to the base 3 side of the elastic tongue 5, and a second plane 29b that extends orthogonally to the longitudinal direction of the elastic tongue 5 from the lower end of this first plane face 29a to the inside face 5b of the elastic tongue 5.

The operation will now be described as below.

Because the engaging operations of the snap fit mechanism 1 with the arm-clamper 23 and to the lever stopper 25 are similar to the ones in the first embodiment, the explanation thereof will be omitted.

After the arm-clamper 23 and the lever stopper 25 are rotatably secured by the snap fit mechanism 1, even if the engaging inclined face 11 receives a load exerted toward the base 3 (in a direction of arrow D) by the contact of, for example, a worker's finger or the like with the tip of the elastic tongue 5 at assembling work, the amount of the inward (in a direction of arrow B) elastic deformation of the elastic tongue 5 can be reduced as compared with the case in which the far end 11b is located inwardly across the above-mentioned centerline C and further the above-mentioned notch 29 is not provided. This is because the far end 11b of the engaging inclined face 11 is located close to the outside face 5a of the elastic tongue 5 across the centerline C in a longitudinal direction of the elastic tongue 5, and further the upper part of the engaging claw 7 can be partially elastically deformed to the notch 29 side by the load received on the engaging inclined face 11, thereby absorbing the influence of the load.

As mentioned above, according to the third embodiment, the snap fit mechanism 1 can be arranged such that the notch 29 is provided inside the tip of the elastic tongue 5. For this reason, even if the engaging inclined face 11 receives a load exerted toward the base 3 (in a direction of arrow D) by the contact of, for example, a worker's finger or the like with the tip of the elastic tongue 5 at assembling work, the upper part of the engaging claw 7 can be partially elastically deformed by this load and thereby can absorb the influence of the load. As a result, the amount of the inward elastic deformation of the elastic tongue 5 can be reduced, thereby avoiding the accidental release of the engagement therebetween.

In the first to third embodiments, the snap fit mechanism 1 in which the engaging claw 7 that engages the through hole 23b and through hole 25a of the arm-clamper 23 and lever stopper 25, respectively, as the to-be-secured members is provided outside the tip of the elastic tongue 5 has been described. However, the present invention is not limited to the specific embodiments. The snap fit mechanism according to the present invention can include, for example, a mechanism in which an engaging claw is provided inside the tip of the elastic tongue. Such a snap fit mechanism can be applied to the purpose of securing a to-be-secured member in such a manner that the member is wrapped from outside by an engaging claw provided inside each of the tips of a plurality of the elastic tongues. In this case, a cavity or an opening that can receive the to-be-secured member therein may be provided in the base supporting the elastic tongues.

What is claimed is:

1. A snap fit mechanism comprising:
   a base that has a first securing face;
   a pair of elastic tongues extending from the first securing face of the base, said elastic tongues being diametrically opposed so as to face each other; and an engaging claw extending sideward from the tip of each of the elastic tongues respectively, each engaging claw including a second securing face that secures a to-be-secured member between the first securing face of the base and the second securing face itself, and a first inclined face extending obliquely sideward from the tip of the elastic tongue, wherein a far end of the first inclined face from the base is located between one side face on the second securing face side of the elastic tongue and a center line in a longitudinal direction of the elastic tongue, and wherein a protrusion is provided between the elastic tongues which extends along a length of the tongues.

2. The snap fit mechanism according to claim 1, wherein the elastic tongues respectively have a second inclined face on the side opposite to the first inclined face of the engaging claw and a far end of the second inclined face from the base is located close to the second securing face across the centerline in the longitudinal direction of the elastic tongues.

3. The snap fit mechanism according to claim 2, wherein a plane face that is substantially orthogonal to a longitudinal direction of the elastic tongues respectively is formed between the first inclined face of the engaging claw and the second inclined face of the elastic tongues.

4. The snap fit mechanism according to claim 1, wherein a notch respectively is formed on the side opposite to the first inclined face of the engaging claw at the tip of the elastic tongues.

5. A snap fit mechanism comprising:

a base that has a first securing face;

a pair of elastic tongues extending from the first securing face of the base, said elastic tongues being diametrically opposed so as to face each other; and an engaging claw extending sideward from the tip of each of the elastic tongues respectively, each engaging claw including a second securing face that secures a to-be-secured member between the first securing face of the base and the second securing face itself, and a first inclined face extending obliquely sideward from the tip of the elastic tongue, wherein a far end of the first inclined face from the base is located between one side face on the second securing face side of the elastic tongue and a center line in a longitudinal direction of the elastic tongue, wherein the elastic tongues respectively have a second inclined face on the side opposite to the first inclined face of the engaging claw and a far end of the second inclined face from the base is located close to the second securing face across the centerline in the longitudinal direction of the elastic tongues, and wherein a plane face that is substantially orthogonal to a longitudinal direction of the elastic tongues respectively is formed between the first inclined face of the engaging claw and the second inclined face of the elastic tongues.

6. A snap fit mechanism comprising:

a base that has a first securing face;

a pair of elastic tongues extending from the first securing face of the base, said elastic tongues being diametrically opposed so as to face each other; and an engaging claw extending sideward from the tip of each of the elastic tongues respectively, each engaging claw including a second securing face that secures a to-be-secured member between the first securing face of the base and the second securing face itself, and a first inclined face extending obliquely sideward from the tip of the elastic tongue, wherein a far end of the first inclined face from the base is located between one side face on the second securing face side of the elastic tongue and a center line in a longitudinal direction of the elastic tongue, and wherein a notch respectively is formed on the side opposite to the first inclined face of the engaging claw at the tip of the elastic tongues.

7. The snap fit mechanism according to claim 5, wherein a notch respectively is formed on the side opposite to the first inclined face of the engaging claw at the tip of the elastic tongues.

8. The snap fit mechanism according to claim 5, wherein a protrusion is provided between the elastic tongues which extends along a length of the tongues.

9. The snap fit mechanism according to claim 6, wherein the elastic tongues respectively have a second inclined face on the side opposite to the first inclined face of the engaging claw and a far end of the second inclined face from the base is located close to the second securing face across the centerline in the longitudinal direction of the elastic tongues.

10. The snap fit mechanism according to claim 9, wherein a plane face that is substantially orthogonal to a longitudinal direction of the elastic tongues respectively is formed between the first inclined face of the engaging claw and the second inclined face of the elastic tongues.

11. The snap fit mechanism according to claim 6, wherein a protrusion is provided between the elastic tongues which extends along a length of the tongues.

* * * * *